March 18, 1952   G. B. L. SMITH ET AL   2,589,635
ELECTROCHEMICAL PROCESS
Filed March 13, 1945
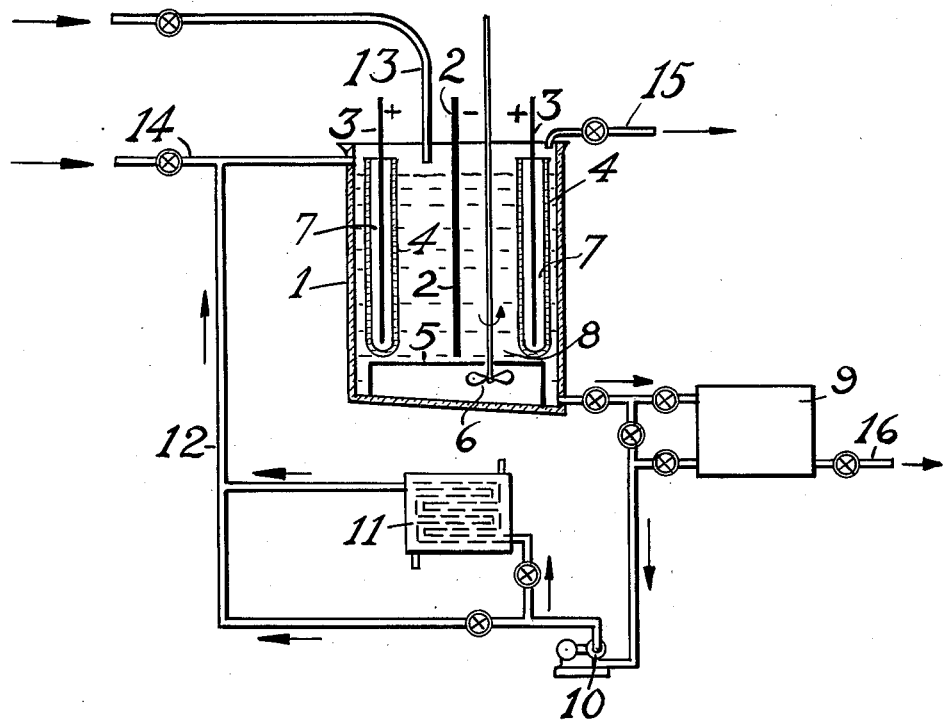
Gilbert B. L. Smith
Morton W. Leeds   Inventors
By   W. H. Smyers Patented Mar. 18, 1952

2,589,635

UNITED STATES PATENT OFFICE 2,589,635

ELECTROCHEMICAL PROCESS

Gilbert B. L. Smith and Morton W. Leeds, Brooklyn, N. Y., assignors to Polytechnic Institute of Brooklyn, Kings County, N. Y.

Application March 13, 1945, Serial No. 582,549

6 Claims. (Cl. 204—74)

This invention relates to a process for the electrolytic reduction of organic chemical compounds particularly those of the nitro-alkanol class.

One object of the invention is to provide an efficient method of manufacturing alkanol hydroxylamines, a class of chemical compounds which has heretofore been difficult to prepare economically on a large scale. Another object is to provide electrodes which cooperate with the other features of the invention to give both high current efficiency and high yield.

The primary reaction involved in this invention may be summarized chemically as follows:

(1)  $HORNO_2 + 2H_2 \rightarrow HORNHOH + H_2O$ where R represents a lower alkylene group, e. g., having 1 to 10, preferably 1 to 5 carbon atoms. Since reduction is accompanied by the addition of electrons, which in case of electrolysis are obtained from the electrolytic cell, the reaction is better written electrochemically as follows:

(2)  $HORNO_2 + 4H^+ + 4e \rightarrow HORNHOH + H_2O$

Although the problem of electrolytic reduction of organic compounds has been the subject of much experimental work, the exact mechanism of the reactions involved is still not clear. For instance, it is not known whether (a) the H protons attach themselves first to the organic molecule and then the resulting ion is discharged; (b) the electrons pass from the electrode (cathode) to organic molecule, and the resulting ion combines with the protons; (c) the protons are discharged to form atoms, and the latter reduce the organic molecule; or (d) the hydrogen atoms combine to form hydrogen molecules which reduce the organic molecule with the cathode material acting as catalyst. It is also not known why some electrode materials, electrolytes, and operating conditions favor the formation of certain reduction products whereas others favor the formation of intermediates or further reduction products or even entirely different products. For instance, a cadmium cathode favors reduction of ketones to hydrocarbons, but lead and mercury cathodes favor production of secondary hydroxy derivatives of which the hydrocarbons are not subsequent reduction products.

It has now been found that nitroalcohols can be electrolytically reduced to alkanol hydroxylamines with good selectivity and high current efficiency in the presence of an aqueous inorganic acid catholyte and if at least one electrode, preferably the cathode, comprises a high overvoltage metal. It has been discovered that the nitroalcohols, when dissolved in aqueous electrolytes such as dilute sulfuric acid, are readily and efficiently reduced to the corresponding alkanol hydroxylamines, and that good overall yields and current efficiencies are obtained by agitating the catholyte so as to constantly bring in contact with the cathode fresh electrolyte containing dissolved therein a small amount of the nitroalcohol.

The invention applies particularly to nitroalcohols having the general formula $HORNO_2$ where R is an alkylene group, preferably a lower alkylene group having 1 to 10 carbon atoms. The nitro group may be in a primary, secondary or tertiary position and the alkylene group may be straight chained or branched. Examples of suitable materials coming within this class of compounds include 2-nitro 2-methyl 1-propanol, 2-nitropropanol, nitroethanol, nitromethanol, 2-nitrobutanol, nitrooctanol, 3 - nitropropanol, 2-nitro 2-hydroxy propane, 1-nitro 2-hydroxy propane, various nitropentanols, etc.

The electrodes should be made of a suitable high overvoltage metal such as lead, zinc, mercury, tin, and the like. These electrodes are preferably used in solid sheet form, such as sheet lead or sheet zinc, or a sheet lead which has been amalgamated on the surface with mercury. When lead is used as electrodes it may be, and preferably is, a technical lead rather than a chemically pure lead. These various metals, suggested above are preferably used in cathodes, and the anodes may be any one of those metals, but preferably just ordinary technical lead.

In order to carry out the invention various types of electrolytic cells may be used, as will be apparent to those skilled in the art, but it is preferred that both electrodes, i. e., both anode and cathode, be used in solid sheet form, either having flat, circular, or other suitable shape, and it is preferred that the anode strip or sheet be separated from the cathode by a porous diaphragm or membrane, and usually this is best accomplished by placing the anode in a rectangular, circular or other suitably shaped container made of a porous substance such as porcelain or acid-resistant clay, etc., and then placing this porous container within a larger outer container in which are also placed the cathode and the catholyte, i. e., the electrolyte which is in contact with the cathode, the nitroalkanol being mixed into the catholyte. The anolyte should of course be placed in the porous cup containing the anode.

The electrode and the porous diaphragm may either be suspended from the upper part of the cell by suitable supports or they may be rested on the bottom of the cell or on a rack or stand or perforated artificial bottom which will hold up the electrodes and porous diaphragm while still permitting proper circulation of the catholyte liquid. Suitable means should be provided for agitating the catholyte, particularly with respect to the portions thereof which are immediately in contact with the cathode. This agitation may be accomplished by placing a mechanical agitator directly in the cell, or by pumping the catholyte into the cell through inlet pipes so directed as to cause the desired circulation of the liquid within the cell, with subsequent removal from a suitable discharge point and then recirculation. A single cell may contain a plurality of anodes and cathodes, and the number of cathodes need not necessarily be the same as the number of anodes, provided only that the total cathode surface be maintained in proper relationship to the total anode surface. Generally this relationship should be approximately equal areas.

The process may be carried out either by batch operation or continuous operation or semi-continuous operation, as for instance by having a plurality of cells, at least one of which is used for electrolytic reduction, while at least one of the others is being drained of catholyte, alkanol hydroxylamine, and any unreacted nitroalkanol, which materials are all passed to a suitable recovery system, and the cell is then filled with fresh catholyte and nitroalkanol.

Suitable means should be provided for controlling the temperature of the catholyte during the electrolytic reduction. This may be accomplished either by providing heating or cooling coils directly within the electrolytic cell or preferably entirely separate and outside of the cell and then causing circulation of the catholyte from the cell through the external temperature control coils or bath and then back into the cell again, this circulation being effected by a pump or other suitable means.

The walls and bottom of the cell proper should preferably be made of suitable non-metallic, acid-resistant material such as glass, tile, hard rubber, wax-impregnated wood, etc.

The catholyte to be used should be an aqueous solution of an inorganic acid such as sulfuric acid, having a concentration of about 2 to 10% by weight, perferably about 3 to 7%. 5% aqueous sulfuric acid has proved very satisfactory. The anolyte should generally be of a similar nature and similar concentration to the catholyte, although it need not be identical. 5% sulfuric acid has proved very satisfactory for use as anolytes.

In carrying out the invention the temperature of the catholyte should be controlled within the approximate limits of 0 to 35° C. Generally room temperature, or a temperature ranging within the approximate limits of about 15 to 25° C., and a catholyte consisting of an aqueous solution of about 4 to 6% by weight of sulfuric acid are preferred.

It is also important to control the electrical factors during the electrolytic reduction according to this invention. For instance, the current density as expressed in amperes/sq. decimeter should be within the general range of 0.1 to 5.0, preferably 0.5 to 2.0 amp./sq. dcm. The voltage required to obtain the desired current will of course depend upon the general construction of the cell, including factors such as the conductivity of the electrolyte, the spacing of the electrodes, etc. Normally an applied voltage of about 1 to 6, preferably about 2 to 5, will give satisfactory results. The cathode potential, which is a measure of the voltage drop between any particular portion of the cathode and the portion of catholyte immediately in contact therewith, should generally be maintained within the range of about 0.5 to about 1.0, preferably about 0.7 to 0.9.

The invention will be better understood from a consideration of the following illustrative description read in conjunction with the accompanying drawing, and from a consideration of the experimental data as set forth.

In the accompanying drawing the cell 1 is shown as containing a single cathode 2 and two anodes 3 which latter are placed within suitable porous diaphragm 4. These electrodes and porous diaphragms are supported on a perforated false bottom 5 under which an agitator 6 is driven by suitable external means not shown. Anolyte liquid 7 is placed within the porous diaphragm 4 so as to contact with the anodes 3 while catholyte 8 fills all of the remaining space in the cell up to the desired surface level near the top of the cell.

The cell 1 is connected by suitable pipes and valves to a recovery system 9, a pump 10, a temperature control coil 11, and finally a recycle line 12, so that during batch operation the catholyte in cell 1 may be withdrawn from the bottom of the cell and pumped by means of pump 10 either through the temperature control 11 or by-passed around it and then recycled through line 12 back into the top of cell 1. Nitroalkanol feed may be fed into the cell through a suitable inlet pipe 13, while make-up water or sulfuric acid may be added to line 14 to control the concentration of the catholyte as desired. A vent 15 may be provided at the top of the cell to permit escape of any gases which may be formed in the cell. If it is desired to operate the cell continuously then the catholyte withdrawn from cell 1 is passed to the recovery system 9, not shown in detail, recovered alkanol hydroxylamine is withdrawn through line 16, and separated catholyte acid solution, with or without any unreacted nitroalkanol, is recycled through pump 10 and line 12 back into cell 1.

2-nitro 2-methyl 1-propanol was subjected to electrolytic reduction to convert it into the corresponding alkanol hydroxylamine, using an electrolytic cell constructed along the principles of that illustrated in the accompanying drawing. For this test the cell used consisted of a glass tank having a tall rectangular shape, lead anodes were used suspended in rectangular porous clay diaphragms supported on the bottom of the cell by means of a small lead support, and the cathode used was a sheet of technical lead amalgamated on the surface. The conditions of operation and the results of the test are summarized in the following table:

Catholyte, 5500 ml. of 5% sulfuric acid containing 217.5 g. of 2-nitro 2-methyl 1-propanol
Anolyte, 5% sulfuric acid
Current density, 1 amp./sq. dcm.
Voltage, 4.0 to 4.5
Temp., 25 to 30° C.
Current efficiency, 85.9% (over-all average)
Yield, 78.5%

The product was recovered from the catholyte by adding barium carbonate to precipitate the sulfuric acid as barium sulfate, filtering, acidifying with hydrochloric acid, and concentrating the liquor to crystallize out the alkanol hydroxylamine as the hydrochloride salt.

The above data indicate that surprisingly high current efficiency and selective reduction of nitroalkanol to the corresponding alkanol hydroxylamine can be obtained according to this invention.

In the appended claims the expression "high overvoltage metal" is intended to mean a metal having an overvoltage in the general range of that of lead, zinc, mercury and tin.

It is not intended that this invention be limited to the particular materials and operating conditions which have been given merely for the sake of illustration nor to the particular apparatus used for illustrating a suitable modification of the invention, but only by the appended claims in which it is intended to claim all modifications coming within the scope and spirit of the invention.

We claim:

1. The process which comprises electrolytically reducing a nitro-alkanol to the corresponding alkanol hydroxylamine in the presence of an aqueous inorganic acid catholyte, using both positive and negative electrodes consisting essentially of high overvoltage metal having an overvoltage value at least as high as that of tin, and a catholyte consisting essentially of an aqueous solution of sulfuric acid of about 3 to 10% concentration by weight, at a temperature of about 0 to 35° C.

2. The process of electrolytically reducing a nitro-alkanol having 1 to 10 carbon atoms to the corresponding alkanol hydroxylamine which comprises carrying out the electrolytic reduction thereof in the presence of a catholyte comprising an aqueous solution of inorganic acid of 2 to 10% concentration by weight free of other added organic substances, and using both positive and negative electrodes composed of high overvoltage metal and in solid sheet form, separated by a porous diaphragm, and agitating the catholyte.

3. The process comprising electrolytically reducing 2-nitro 2-methyl 1-propanol to the corresponding propanol hydroxylamine.

4. The process of producing an alkanol hydroxylamine which comprises electrolytically reducing a nitro-alkanol having not more than 5 carbon atoms, in the presence of a catholyte consisting of an aqueous solution of sulfuric acid of about 2 to 10% concentration by weight, at a temperature of about 0 to 35° C., using a current density of about 0.1 to 5.0 amp./sq. dcm., a voltage of about 1 to 6, and using a high overvoltage metal having an overvoltage value at least as high as that of tin as cathode.

5. The process comprising electrolytically reducing 2-nitro 2-methyl 1-propanol to the corresponding propanol hydroxylamine, in the presence of a catholyte consisting of aqueous sulfuric acid of about 5% by weight concentration, using proportions of said propanol and aqueous acid corresponding substantially to about 217 g. of the propanol to about 5500 ml. of the acid, at about 15 to 30° C., using a current density of about 0.5 to 2.0 amp./sq. dcm., a voltage of about 2 to 5, a cathode potential of about 0.7 to 0.9, and using as cathode a sheet of technical lead amalgamated on the surface.

6. The process which comprises electrolytically reducing a nitro-alkanol having the general formula HO—R—$NO_2$ where R represents an alkylene group having 1 to 10 carbon atoms, to the corresponding alkanol hydroxylamine having the general formula HO—R—NHOH, in the presence of a catholyte consisting essentially of an aqueous solution of an inorganic acid of about 2 to 10% by weight concentration substantially free of other added organic substances, at a temperature of about 0 to 35° C., using as cathode a high overvoltage metal having an overvoltage value at least as high as that of tin.

GILBERT B. L. SMITH.
MORTON W. LEEDS.

REFERENCES CITED

The following references are of record in the file of this patent:

UNITED STATES PATENTS

| Number | Name | Date |
|---|---|---|
| 680,543 | Pip | Aug. 13, 1901 |
| 1,239,822 | Piguet et al. | Sept. 11, 1917 |
| 1,378,939 | Cole | May 24, 1921 |
| 1,947,732 | Parkes | Feb. 20, 1934 |
| 2,256,434 | Klavehn et al. | Sept. 16, 1941 |
| 2,408,096 | Pierce et al. | Sept. 24, 1946 |
| 2,485,982 | McMillan | Oct. 25, 1949 |

OTHER REFERENCES

Pierron, article in Bulletin de la Societe Chimique de Paris, Third Series, vol. 21, pp. 780–785, 1899.

Bruckner et al., article abstracted in Chemical Abstracts, vol. 33, pp. 1602, 1939.

Brockman, Electro-Organic Chemistry, 1926, pp. 178–183, 260 and 261.

Swann, Transactions of the Electrochemical Society, vol. 77, pp. 469, 471 and 472, 1940.

Beilstein, Handbuch der Organschen Chemie, 4th Edition, Zweites Erganzungswerk, vol. III–IV, pp. 955–957, 1942.

Pearson et al., Transactions Electrochemical Society, vol. 84, pp. 173–177, 1943.